US010576869B2

(12) United States Patent
Villacres Mesias

(10) Patent No.: US 10,576,869 B2
(45) Date of Patent: Mar. 3, 2020

(54) SELF-RETRACTABLE CARGO NET

(71) Applicant: Ford Global Technologies, LLC, Dearborn, MI (US)

(72) Inventor: Diego Fabricio Villacres Mesias, San Mateo Atenco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 15/415,972

(22) Filed: Jan. 26, 2017

(65) Prior Publication Data

US 2018/0208103 A1 Jul. 26, 2018

(51) Int. Cl.
*B60R 11/06* (2006.01)
*B60P 7/08* (2006.01)
*B60R 5/04* (2006.01)

(52) U.S. Cl.
CPC .............. *B60P 7/0876* (2013.01); *B60R 5/04* (2013.01)

(58) Field of Classification Search
CPC .. B60R 21/06; B60R 5/04; B60R 7/02; B60R 7/005; B60R 11/00; B60R 2011/0036; A63B 2102/02; A63B 61/02; A63B 2102/04

See application file for complete search history.

(56) References Cited

U.S. PATENT DOCUMENTS

| | | | | |
|---|---|---|---|---|
| 4,763,944 A * | 8/1988 | Fry | ........................... | B60P 7/14 296/180.1 |
| 4,986,389 A * | 1/1991 | Halligan, Sr. | ........... | E04G 21/28 182/138 |
| 5,090,856 A * | 2/1992 | Moore | ..................... | B60R 21/06 180/271 |
| 5,121,958 A * | 6/1992 | Goeden | ................... | B60R 7/005 296/24.43 |
| 5,186,587 A * | 2/1993 | Moore | ..................... | B60R 21/06 180/271 |
| 5,253,913 A * | 10/1993 | Metivier | ................... | B60R 9/00 296/183.1 |
| 5,340,004 A * | 8/1994 | Moore | ..................... | B60R 7/005 224/404 |
| 5,427,486 A * | 6/1995 | Green | ....................... | B60P 7/14 296/183.1 |
| 5,452,973 A * | 9/1995 | Arvin | ..................... | B60P 7/0876 410/117 |
| 5,529,341 A * | 6/1996 | Hartigan | ................. | B60R 21/06 280/749 |
| 5,533,773 A * | 7/1996 | Lessick | ................... | B60R 21/06 296/180.1 |
| 5,632,520 A * | 5/1997 | Butz | ....................... | B60R 5/006 296/24.43 |

(Continued)

FOREIGN PATENT DOCUMENTS

DE 202016102329 U1 7/2016
FR 2873971 A1 2/2006

*Primary Examiner* — Kiran B Patel
(74) *Attorney, Agent, or Firm* — Vichit Chea; Brooks Kushman, P.C.

(57) ABSTRACT

A cargo assembly arranged vertically on one of the side panels of a vehicle trunk may include a spool including a roll arranged between two caps, a net configured to be wound around a spool, and a rod arranged on an end of the net and including at least one cargo hook configured to engage with a vehicle hook arranged on a side of a trunk opposite the spool.

11 Claims, 3 Drawing Sheets

(56) References Cited

U.S. PATENT DOCUMENTS

| | | | | |
|---|---|---|---|---|
| 5,772,370 A * | 6/1998 | Moore | B60R 7/005 | 296/37.16 |
| 5,924,611 A * | 7/1999 | Mizuno | B60R 7/005 | 224/42.4 |
| 6,030,160 A * | 2/2000 | Moore | B60R 7/005 | 410/106 |
| 6,155,621 A * | 12/2000 | Nishida | B60R 21/06 | 280/749 |
| 6,349,986 B1 * | 2/2002 | Seel | B60R 5/047 | 160/265 |
| 6,439,633 B2 * | 8/2002 | Nemoto | B60P 7/0876 | 296/37.14 |
| 6,557,926 B1 * | 5/2003 | Bacher | B60R 7/005 | 280/749 |
| 6,598,921 B2 | 7/2003 | Seel et al. | | |
| 6,616,389 B1 * | 9/2003 | Ament | B60R 7/005 | 410/100 |
| 6,739,812 B1 * | 5/2004 | Pfeifer | B60R 21/06 | 280/749 |
| 7,048,319 B2 * | 5/2006 | Ament | B60R 5/047 | 296/37.16 |
| 7,287,796 B2 * | 10/2007 | Coles | B60R 5/044 | 160/370.23 |
| 7,297,079 B1 * | 11/2007 | Delauter | A63B 61/02 | 273/349 |
| 7,318,617 B1 * | 1/2008 | Scotton | B60R 5/045 | 224/484 |
| 7,618,081 B2 * | 11/2009 | Rankin | B60R 7/005 | 135/913 |
| 7,708,327 B2 * | 5/2010 | Lim | B60R 7/02 | 296/37.1 |
| 7,819,451 B2 * | 10/2010 | Yoshida | B60R 7/02 | 296/24.4 |
| 7,950,884 B2 * | 5/2011 | Thompson | B61D 45/006 | 410/118 |
| 8,376,086 B1 * | 2/2013 | Moyer | E04G 21/3266 | 182/138 |
| 8,419,102 B2 * | 4/2013 | Takemura | B60R 5/047 | 160/290.1 |
| 8,523,268 B2 * | 9/2013 | Kikuchi | B60R 5/047 | 296/136.03 |
| 8,646,807 B2 * | 2/2014 | Suga | B60R 21/06 | 280/730.2 |
| 8,740,525 B2 * | 6/2014 | Coury | B60P 7/0876 | 410/100 |
| 8,757,947 B2 * | 6/2014 | Knox | B60P 7/0876 | 410/118 |
| 8,876,184 B2 * | 11/2014 | Lucas | B60R 7/043 | 296/24.44 |
| 8,959,791 B2 * | 2/2015 | Knell | D06F 57/12 | 34/239 |
| 9,238,438 B1 * | 1/2016 | Valencia Cruz | B60R 7/02 | |
| 9,566,895 B2 * | 2/2017 | Knox | B60P 7/00 | |
| 9,738,226 B2 * | 8/2017 | Kamada | B60R 5/048 | |
| 2001/0050298 A1 * | 12/2001 | Larsen | B60R 7/04 | 224/311 |
| 2002/0043543 A1 * | 4/2002 | McMurray | B60R 7/005 | 224/563 |
| 2003/0090119 A1 * | 5/2003 | Bateman | B60R 21/06 | 296/24.43 |
| 2006/0140715 A1 * | 6/2006 | Lyddon | E01F 13/12 | 404/6 |
| 2009/0045652 A1 * | 2/2009 | Mossberg | B60R 21/06 | 296/193.08 |
| 2010/0290856 A1 * | 11/2010 | Zahorec | B60R 7/005 | 410/118 |
| 2016/0059787 A1 * | 3/2016 | Stakoe | B60R 5/044 | 296/24.43 |
| 2016/0326782 A1 * | 11/2016 | Muiter | B60R 3/00 | |

* cited by examiner

SELF-RETRACTABLE CARGO NET

TECHNICAL FIELD

Disclosed herein are self-retractable cargo nets.

BACKGROUND

Motor vehicles often include cargo nets within their trunk space to store items and prevent the items from moving within the trunk during transit.

SUMMARY

A vehicle may include a vehicle trunk defining a trunk opening between two trunk side panels, a cargo assembly arranged vertically on one of the side panels and including a net wound around a spool, and a vehicle hook arranged on an opposite one of the side panels, wherein the net is configured to unwind from the spool, extend across the trunk opening and attach to the vehicle hook.

A cargo assembly arranged vertically on one of the side panels of a vehicle trunk may include a spool including a roll arranged between two caps, a net configured to be wound around a spool, and a rod arranged on an end of the net and including at least one cargo hook configured to engage with a vehicle hook arranged on a side of a trunk opposite the spool.

A cargo assembly arranged within a side panel of a vehicle trunk may include a spool including a roll arranged between two caps arranged behind a side panel of a vehicle trunk, a net configured to be wound around a spool, and a bezel arranged on an end of the net and including at least one cargo hook configured to engage with a vehicle hook arranged on a side of a trunk opposite the spool, the bezel configured to abut a side panel and prevent the hook from retracting into an opening of the side panel.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Cargo nets may be convenience accessories used in sedans, hatchbacks, and sport utility vehicles to store items to prevent the items from moving throughout the trunk during transit. These nets often include components that require the nets to be installed/uninstalled for each use. In one example, multiple mushroom-type hooks or D-rings may be anchored to the vehicle frame. The net may be attached to these hooks when in use, and detached during non-use in order to allow full-access to the trunk. Installing and uninstalling the net may take time, and may be inconvenient to users who have their hands full carrying other items.

Further, during non-use or in a stored state, cargo nets may be stored in the trunk. The nets may lay in the trunk and become tangled, get in the way. In some instances, the nets may be taken out of the vehicle and thus, not be available when needed.

Disclosed herein is an integrated, vertically mounted, cargo assembly that is self-retractable and includes a net configured to hold items. The net may be maintained around a spool during non-use. The spool may be arranged on or within a side panel of the trunk near a trunk door. A hook may be arranged on the opposite side panel at an opposite end of the trunk. During use, the net may extend across the opening of a trunk from the spool and attach to the hook. The spool may include a spring mechanism configured to apply tension to the net creating a taut net in an extended state. A top portion of the net may be configured to receive items and the items may be stored within the net to prevent the items from moving throughout the vehicle trunk during transit. Once the items are removed from the net and the net is no longer needed, the net may be disconnected from the hook, retracted, and wound around the spool. The net may be maintained around the spool on the side panel of the trunk during until needed, allowing the net to be easily stored during non-use.

Because the cargo assembly is integrated into the side panel of the vehicle, the cargo net is readily accessible while being stored in a non-obscure location. This allows the cargo net to be kept within the vehicle during non-use, thus eliminating the risk that the cargo net is not available when needed. Further, installation time is reduced due to the net needing to only be attached to one side of the vehicle.

Figure 1:
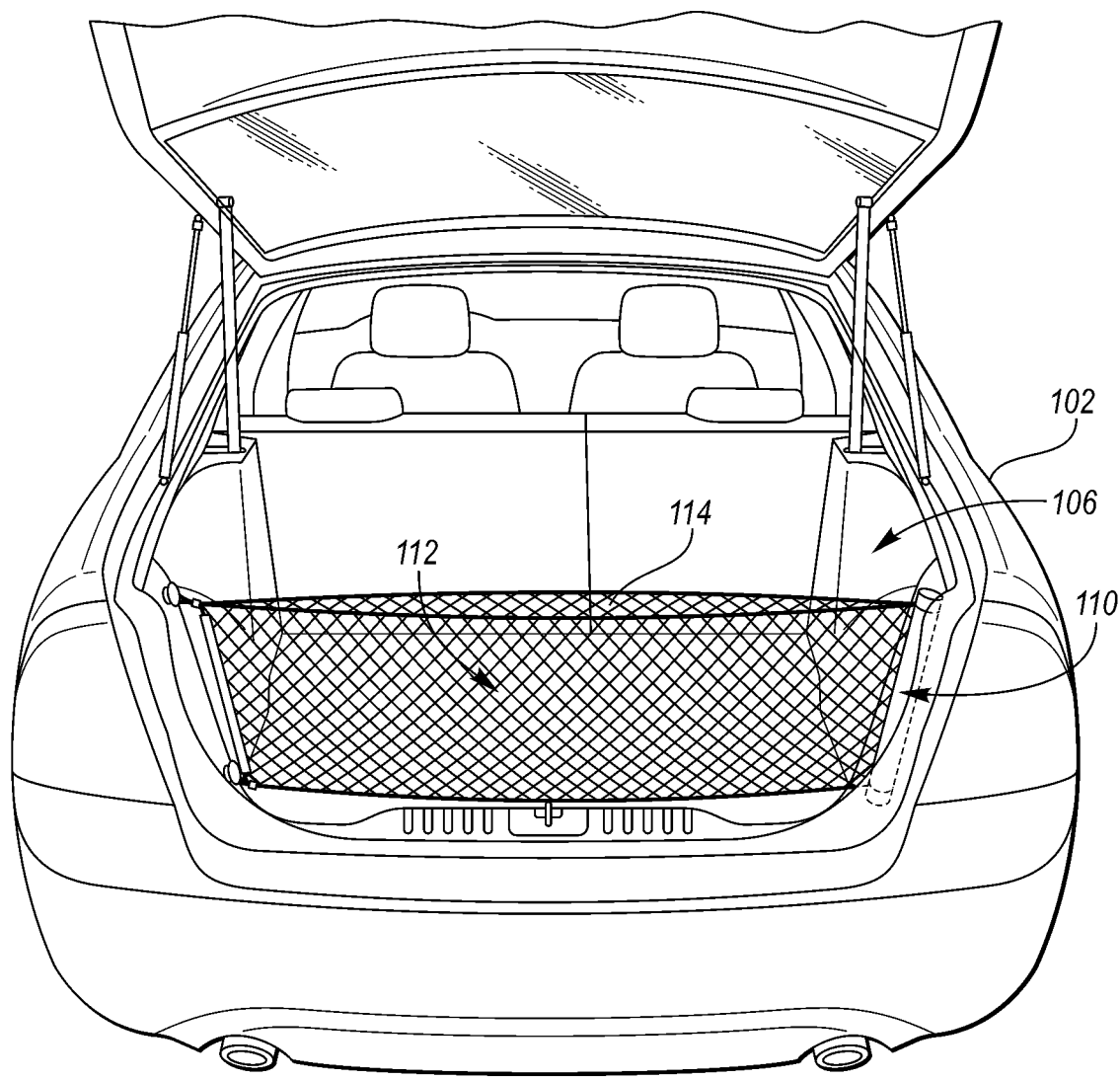
FIG. 1 illustrates a perspective view of a vehicle trunk including an integrated cargo net in an extended position.

FIG. 1 illustrates a vehicle 102 having a vehicle trunk 106. An integrated cargo assembly 110 may be arranged within the trunk 106 and may be configured to extend across an opening of the trunk 106 from one side to another in an extended state. The cargo system 100 may include a net 112 which may define an opening 114. The net 112 may include two nets sewn together at the base (not shown in FIG. 1) opposite the opening 114. Items such as groceries, shopping bags, sporting equipment, etc., may be placed into the opening and may be retained by the cargo net 112.

Figure 2:
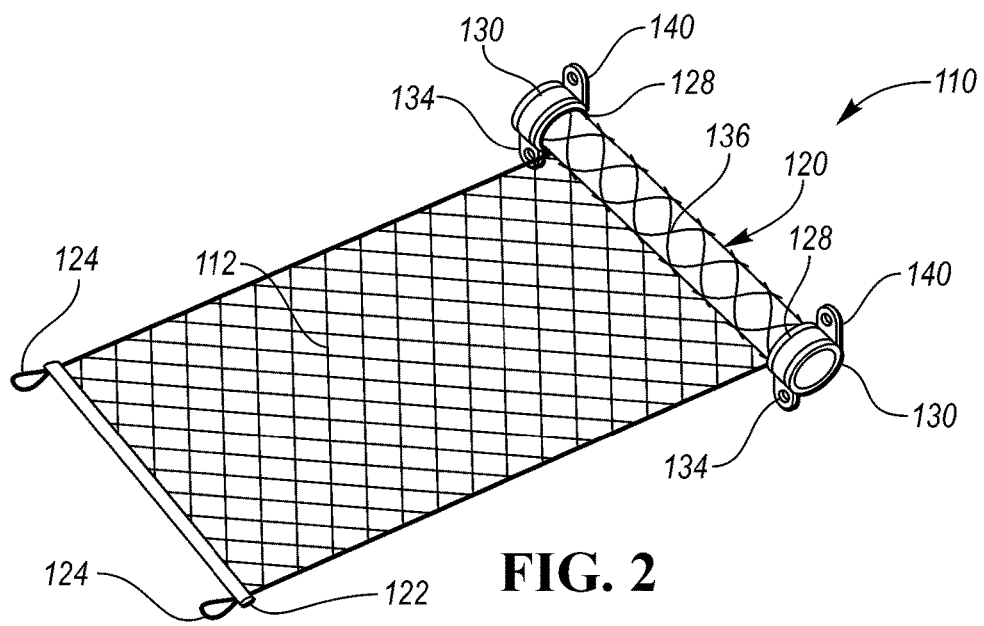
FIG. 2 illustrates a perspective view of the integrated cargo net in a partially extended state.

FIG. 2 illustrates a perspective view of the integrated cargo assembly 110 in a partially extended state. The cargo assembly 110 may include a spool 120 attached to one end of the net 112. The spool may be a cylindrical reel. The net 112 may be wound about the spool during non-use. During installation, the net 112 may be pulled and unwound from the spool. The end of the net 112 may be attached to the spool via a number of mechanisms. The net 112 may be glued or stapled to the spool 120. In another example, the net may be tied around the spool 120.

The assembly 110 may include a rod 122 at an opposite end of the net 112. The rod 122 may be plastic and may attach to the net 112 by pinching the net between two portions of the rod 122. Additionally or alternatively, the net 112 may be glued or stapled to the rod 122. At least one cargo hook 124 may be arranged on the rod 122. In the example shown in the Figures, two cargo hooks 124 are arranged on the rod 122, though more or less may be used in practice. The cargo hooks may include a D-shaped hook, a claw shaped hook, a bungee loop, or a mushroom hook. These hooks 124 may anchor the free end of the net (e.g., the rod 122), to the opposite side panel.

The spool 120 may include a roll 136 arranged between two spool ends 128, each including a spool cap 130. The caps 130 may be arranged to cover the ends 128 and provide a stop 134. The stop 134 may be configured to abut the rod 122 when the assembly 110 is in a retracted state, thus maintaining the rod 122 at a fixed position once the net 112 is wound around the spool 120. Further, each cap 130 may include a connecting mechanism 140 configured to attach to the trim or inside panel of the vehicle trunk.

Figure 4:
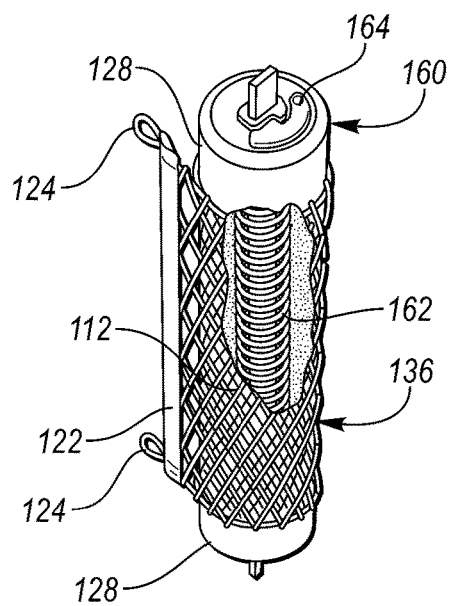
FIG. 4 illustrates an example roll of the cargo assembly.

The spool 120 may be movable within the caps 130. The spool 120 may include a spring assist mechanism (as shown in FIG. 4) arranged at the spool ends 128 and configured to provide a tension against the caps 130. The spring assist mechanism may include a spring and a pawl configured to interact with the caps 130. The net 112 may be extended and retracted along the spool 120 in a way similar to that of a roller shade. The net 112 may be pulled from the spool 120 against a tension created by the spring assist mechanism.

Figure 3:
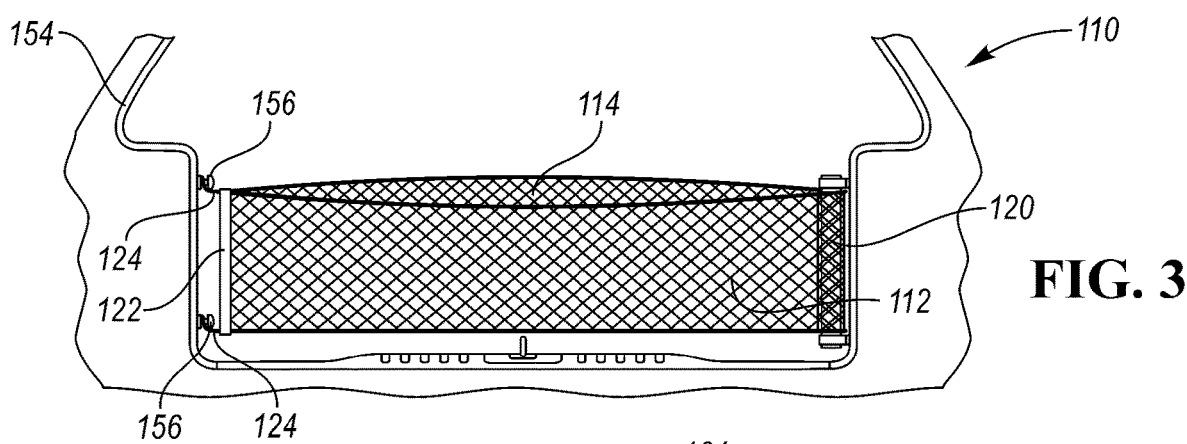
FIG. 3 illustrates a front view of the integrated cargo net in an extended state.

FIG. 3 illustrates a front view of the integrated cargo assembly 110 in an extended state. The spool 120 of the cargo assembly 110 may attach to trim or an inside panel 154 of the vehicle trunk 106. The spool 120 may be bolted or fastened to the sheet metal of the trunk side wall or to the quarter trim panel. As explained, the net 112 may be wound about the spool during non-use. During installation, the net 112 may be pulled and unwound from the spool 120 to an opposite side of the trunk.

Once the net 112 is pulled from the spool 120, the rod 122 may attach to an opposite side of the trunk 106. The cargo hooks 124 may attach to one or more vehicle hooks 156 arranged on the panel 154. The vehicle hooks may include a D-shaped hook or a mushroom hook.

FIG. 4 illustrates an example roll 136 of the cargo assembly 110. The spool 120 may be movable within the caps 130. The spool 120 may include a spring assist mechanism 160 arranged at the spool ends 128 and configured to provide a tension against the caps 130.

The spring assist mechanism 160 may include a spring 162 and a pawl 164 configured to interact with the caps 130 (not shown in FIG. 4). The net 112 may be extended and retracted along the spool 120 in a way similar to that of a roller shade. The net 112 may be pulled from the spool 120 against a tension created by the spring assist mechanism.

When the net 112 is no longer needed, the cargo hooks 124 may be disengaged from the vehicle hooks 156. The roll 136 may rotate between the two caps 130 and the net 112 may be wound around the roll 136. The rod 122 may abut the stops 134 once the net 112 is entirely wound around the roll 136. The net 112 may then be stored on the side of the trunk 106 until needed.

Figure 5:
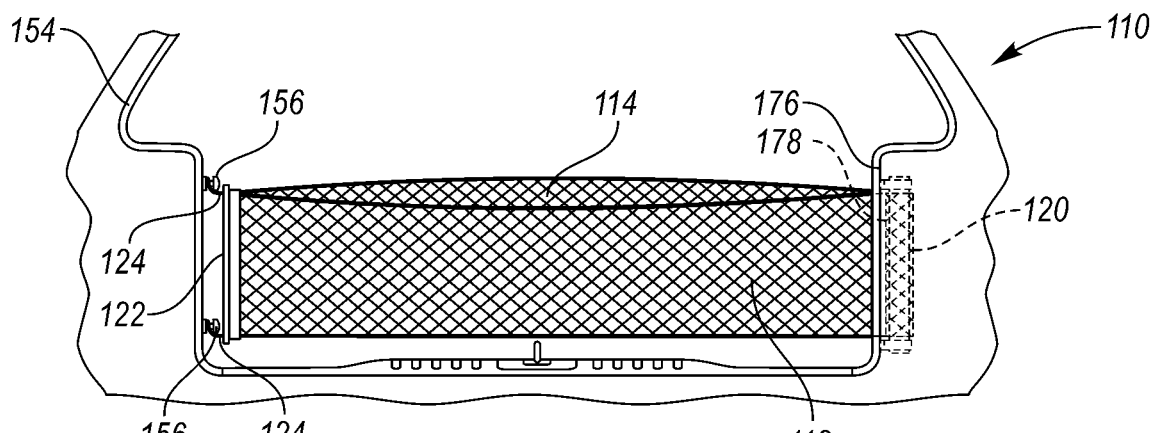
FIG. 5 illustrates another front view of the integrated cargo net in an extended state.
Figure 6:
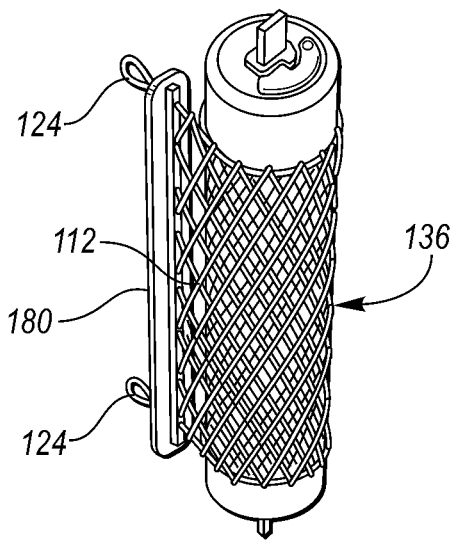
FIG. 6 illustrates another example roll of the cargo assembly.
Figure 7:
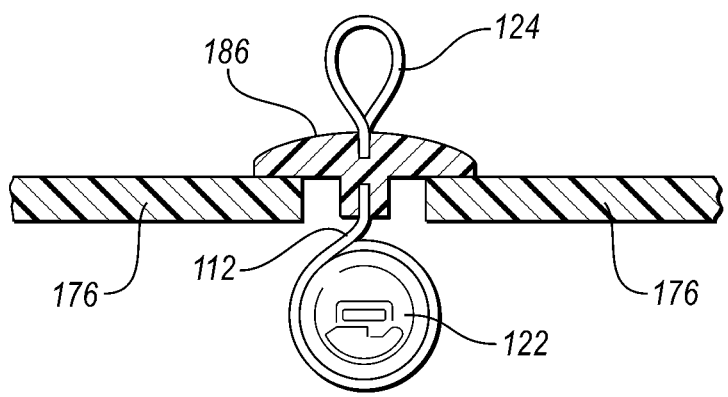
FIG. 7 illustrates a cross-sectional view of the roll of FIG. 6 in a stored state.

In another embodiment, the spool 120 may be packaged behind the trim panel, as shown by way of example in FIGS. 5-7. As best shown in FIG. 7, the trim panel 176 may define an opening 178, allowing the net 112 to be drawn therefrom. The rod 122 may include a flat bezel 180 that is larger than the opening 178 in the trim panel 176. The bezel 180 may cover the opening 178 on the trim panel 176 (where the net 112 passes through) when the net 112 is retracted, the bezel 180, thus, may operate as a stop, preventing the end of the net 112 from fulling retracting behind the trim panel 176.

FIG. 6 illustrates another example roll 136 of the cargo assembly 110. The spool 120 may be movable within the caps 130. The spool 120 may include a spring assist mechanism 160, similar to that described above with respect to FIG. 4. The spool 120 may include the bezel 180 arranged at the end of the net 112, the bezel 180 include at least one hook 124 that may be disengaged from the vehicle hooks 156, as shown in FIG. 5.

Accordingly, a vehicle cargo assembly is disclosed herein that permits convenient and easy to use storage of a net. The net may be readily available should the net be needed, while being conveniently stored around a spool. The spool may be attached to a vehicle trunk in a non-conspicuous but convenient location. The net may then be pulled from the spool, across the trunk opening and attached to the opposite side of the trunk. This action may require very little effort from a user.

Further, because the cargo assembly is embedded in the trunk side/panel, the cargo assembly is always readily available. Installation time is reduced as only one free end needs to be anchored. During impact to the vehicle where the vehicle may move suddenly, the cargo assembly is maintained on the panel and is not shifted (e.g., entering the cockpit).

While the cargo assembly is described and shown herein as being arranged vertically, the assembly may also be placed horizontally above the load floor for a single net application that keeps cargo items steady over a load floor. More than one assembly may also be included and nets may be placed at different depths/positions within the cargo area.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cargo assembly arranged vertically on a side panel of a vehicle trunk,
   comprising:
   a spool including a roll arranged between two caps;
   a net configured to be wound around the spool and defining an opening adjacent to one of the caps; and
   a rod arranged on an end of the net and including at least one cargo hook configured to engage with a vehicle hook arranged on a side of a trunk opposite the spool.

2. The assembly of claim 1, wherein the spool includes a spring configured to bias the net away from the vehicle hook and provide for a to extension of the net in an extended state.

3. The assembly of claim 1, wherein the cargo hook is configured to attach to the vehicle hook and maintain the net across the trunk of the vehicle in an extended state.

4. The assembly of claim 3, wherein the roll is configured to rotate between the caps and accept the net around the roll in a stored state.

5. The assembly of claim 4, wherein the caps each include a stop configured to abut the rod in the stored stated.

6. A vehicle, comprising:
- a cargo assembly arranged vertically on a side panel of a vehicle trunk, the assembly including a spool having a roll arranged between two caps, a net wound around the roll and defining en opening adjacent one of the caps; and
- a vehicle hook arranged on a side of a trunk opposite the spool, wherein the assembly further include a rod arranged on an end of the net and including at least one cargo hook configured to engage with a vehicle hook arranged on a side of a trunk opposite the spool.

7. The vehicle of claim 6, wherein the spool includes a spring configured to bias the net away from the vehicle hook and provide for a taut extension of the net in an extended state.

8. The vehicle of claim 6, wherein the cargo hook is configured to attach to the vehicle hook and maintain the net across the trunk of the vehicle in an extended state.

9. The vehicle of claim 8, wherein the roll configured to rotate between the caps and accept the net around the roll in a stored state.

10. The vehicle of claim 9, wherein the caps each include a stop configured to abut the rod in the stored stated.

11. The vehicle of claim 6, wherein the net defines an opening for receiving items therein.

\* \* \* \* \*